United States Patent [19]

Kitazawa et al.

[11] Patent Number: 4,560,264
[45] Date of Patent: Dec. 24, 1985

[54] DEVICE FOR DISPLAYING DATA IN CAMERA VIEWFINDER

[75] Inventors: Toshiyuki Kitazawa; Tahei Morisawa; Norimichi Takahashi, all of Tokyo, Japan

[73] Assignee: Asahi Kogaku Kogyo Kabushiki Kaisha, Tokyo, Japan

[21] Appl. No.: 575,375

[22] Filed: Jan. 30, 1984

[30] Foreign Application Priority Data

Jan. 29, 1983 [JP] Japan ............................. 58-11449[U]

[51] Int. Cl.$^4$ ...................... G03B 13/02; G03B 17/20
[52] U.S. Cl. ................................. 354/219; 354/289.1; 350/345
[58] Field of Search ...................... 354/289.1, 471, 474, 354/475, 478, 219; 350/345; 362/31, 32

[56] References Cited

U.S. PATENT DOCUMENTS

| | | | |
|---|---|---|---|
| 3,994,564 | 11/1976 | Somogyi | 350/345 |
| 4,043,636 | 8/1977 | Eberhardt et al. | 350/345 |
| 4,051,503 | 9/1977 | Uno et al. | 354/289.1 |
| 4,059,916 | 11/1977 | Tachihara et al. | 350/345 |
| 4,229,783 | 10/1980 | Eberhardt | 350/345 |
| 4,285,029 | 8/1981 | McCoy | 350/345 |
| 4,429,979 | 2/1984 | Terada | 354/289.1 |
| 4,465,355 | 8/1984 | Murakami et al. | 354/475 |

Primary Examiner—A. A. Mathews
Attorney, Agent, or Firm—Sughrue, Mion, Zinn, Macpeak & Seas

[57] ABSTRACT

A camera viewfinder which includes a device for displaying data, such as shutter speed and aperture value. A liquid crystal display and associated illuminating systems are provided for the display device. The illuminating system includes an illuminating lamp and a diffusion plate for diffusing light from the lamp. The diffusion plate has a groove or hole at its center for accommodating the lamp and a flat surface facing the liquid crystal display. The surface of the diffusion plate opposite the flat surface has sloping sides which slope downward from the center of the diffusion plate.

7 Claims, 4 Drawing Figures

DEVICE FOR DISPLAYING DATA IN CAMERA VIEWFINDER

BACKGROUND OF THE INVENTION

This invention relates to a device for displaying data such as shutter speed and aperture value in the viewfinder of a camera.

Conventional display devices of this type are those in which a meter or a light emitting diode is used for displaying such data. Recently, a liquid crystal display element has been used extensively because it is low in power consumption and low in manufacturing cost. However, since the liquid crystal display element does not itself emit light but reflects or emits light from a light source, a light emitting element is usually needed. It is always necessary to use a light emitting source when the liquid crystal is in a dark area. Thus, it is essential to provide an illuminating means for the liquid crystal display means in a camera. However, since the conventional illuminating means is merely an illuminating lamp, data displayed in the finder are not of a uniform brightness. In order to uniformly and brightly illuminate the finder, it is necessary to use a large illuminating lamp. Accordingly, heretofore, the use of the liquid crystal display element was not economical for it required an increase in power consumption and camera size.

SUMMARY OF THE INVENTION

In view of the foregoing, an object of this invention is to provide a device for displaying data in the viewfinder of a camera which can be illuminated by a small illuminating lamp.

The foregoing object of the invention is achieved by the provision of a device for displaying data, such as shutter speed and aperture value, in the viewfinder of a camera using a liquid crystal display element, which display element has an illuminating system comprising an illuminating lamp for applying light to the liquid crystal display element, and a diffusion plate for diffusing the light from the illuminating lamp, the diffusion plate having a groove or hole for accommodating the illuminating lamp, and having a flat surface confronting the liquid crystal display element and a diffusion reflection surface, the diffusion refection surface having downward sloping surfaces extending away from the center of the diffusion reflective surface which is on the side of the diffusion plate opposite its flat side.

DETAILED DESCRIPTION OF THE PREFERRED EMBODIMENTS

Figure 1:
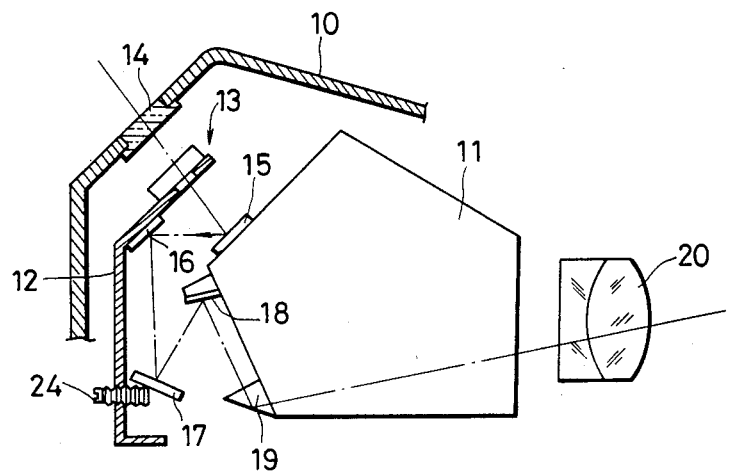
FIG. 1 illustrates a data displaying device in the camera viewfinder of the invention as well as the optical path for light entering the viewfinder.
Figure 2:
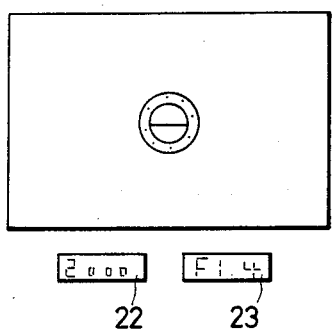
FIG. 2 is a plan view of an example of a display in the camera viewfinder.

This invention will now be described with reference to its preferred embodiments. FIG. 1 shows the entire arrangement of a data displaying device in a viewfinder. A penta prism 11 forming a part of a conventional viewfinder optical system is disposed inside an upper decoration plate 10 of a camera body. A supporting plate 12 is set between the upper decoration plate 10 and the prism 11. A display base 13 including a liquid crystal display element and its illuminating system according to the invention is fixedly mounted on the upper end portion of the supporting plate 12. A light receiving window 14 supported by the upper decoration plate 10 is positioned outside the display base 13. The light receiving window 14 is fabricated by molding resin high in optical transmissivity. The display base 13, being illuminated by the illuminating system included therein or by an external light beam passing through the light receiving window 14, displays data. The data thus displayed are reflected successively by a first mirror 15, a second mirror 16, a third mirror 17, a fourth mirror 18 and a triangular prism 19 and then advanced through the prism 11 and an eye piece 20 to theeye of the photographer. FIG. 2 shows one example of the display in the viewfinder, which display includes a shutter speen indication 22 and an aperture value 23. In FIG. 1, reference numeral 24 designates a screw for adjusting the inclination of the reflecting mirror 17.

Figure 3:
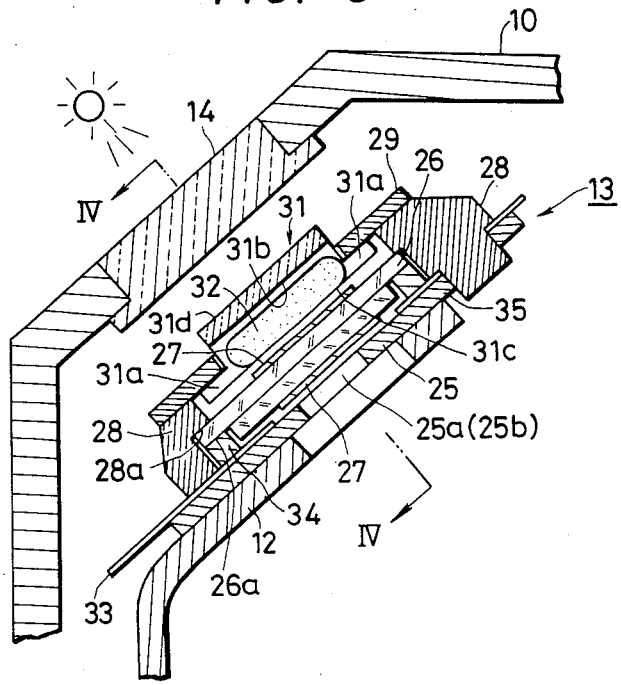
FIG. 3 is an enlarged sectional view showing the components of a viewfinder constructed in accordance with the teachings of the invention.
Figure 4:
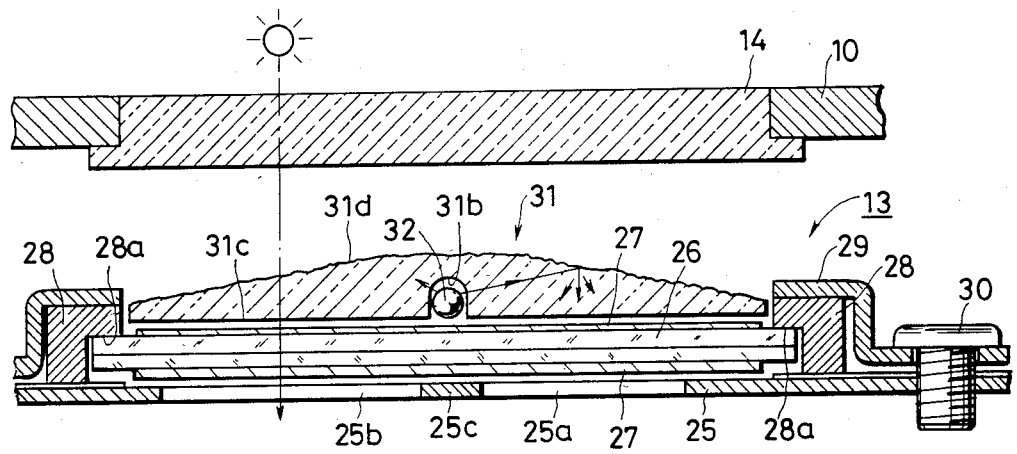
FIG. 4 is a sectional view of the embodiment illustrated in FIG. 3 taken along line IV—IV of FIG. 3.

FIG. 3 and 4 are enlarged sectional views of the display base 13 according to the invention. A liquid crystal plate 25 having a shutter speed display window 25b and an aperture value display window 25a is fixedly mounted on the outside of the supporting plate 12, and the liquid crystal display element 26 is positioned on the plate 25. Liquid crystal is sealed in the liquid crystal display element 26. Polarizing plates 27 and 27, different by 90° in phase, are bonded to both surfaces of the liquid crystal display element 26. The liquid crystal display element 26 is held in the recess 28a of a liquid crystal holding frame 28 which is secured to the liquid crystal plate 25 by a retaining plate 29 and screws 30.

The retaining plate 29 supports a diffusion plate 31 which is located above the liquid crystal display element 26. The diffusion plate 31 has steps 31a (FIG. 3) which are in engagement with the inner surface of the retaining plate 29, and has a groove 31b for accommodating an illuminating lamp 32 at the center. The position of the groove 31b and accordingly the position of the illuminating lamp 32 are in alignment with the position of a frame plate 25c between the aperture value display window 25a and the shutter speed display window 25b. The diffusion plate 31 has a flat surface 31c confronting the liquid crystal display element 26, and a diffusion reflection surface 31d which is opposed to the flat surface 31c. The diffusion reflection surface 31d slopes downward from its center. The angle of the diffusion reflection surface 31d is so determined that light from the illuminating lamp 32, being reflected by the surface 31d, uniformly illuminates the aperture value display window 25a and the shutter speed display window 25b. The diffusion plate 31 is made of a suitable material such as a transparent material like acrylic resin which has optical transmissivity. In the latter case, the diffusion reflection surface 31d is a roughened surface.

In FIG. 3, reference numeral 33 designates a circuit flexible pattern which is connected through an electrically conductive rubber member 34 to a copper foil liquid crystal display element 26a which is an input terminal of the liquid crystal display element 26. The pattern 33 applies display signals to the liquid crystal display element 26. Further in FIG. 3, reference numeral 35 designates a rubber member for supporting the liquid crystal display element 26, the rubber member 35 together with the rubber member 34 being held by the liquid crystal holding frame 28.

When it is bright outside the camera, the liquid crystal display element 26 is illuminated by the external light beam passing through the light receiving window 14 and the diffusion plate 31, so that the display is applied to the viewfinder through the optical path as described with reference to FIG. 1. Since the upper surface of the diffusion plate 31 is the above-described diffusion reflection surface 31d, the display is uniform in brightness although the brightness is somewhat decreased. The effect of the invention is significant when it is dark outside the camera and the illuminating lamp 32 is turned on. The illuminating lamp 32 is accommodated in the groove 31b of the diffusion plate 31, and light from the lamp 32, being uniformly diffused by the diffusion reflection surface 31d, is applied to the liquid crystal display element 26 through the flat surface 31c which is opposed to the surface 31d. Accordingly, the shutter speed display 22 and the aperture value display 23 in FIG. 2 are substantially uniform in brightness. As the illuminating lamp 32 is located immediately above the frame plate 25c between the aperture value dispaly window 25a and the shutter speed display window 25b, light from the lamp 32 is not directly applied to these windows 25a and 25b. The effect is to help make the displays uniform in brightness. The groove 31b for accommodating the illuminating lamp 32 may be cut in the diffusion reflection surface 31d instead of the flat surface 31c, or it may be replaced by a hole.

As is apparent from the above description, in the data displaying device of the invention, the liquid crystal display element is illuminated by means of the illuminating lamp and the diffusion plate. The illuminating lamp is accommodated in the groove or hole cut in the diffusion plate, and the diffusion plate has a flat surface confronting the liquid crystal display element and downward sloping surfaces, which extend from the center of the diffusion reflecting surface, on the side opposite to the flat surface. Therefore, the small illiminating lamp can efficiently and uniformly illuminate the display element, which will sufficiently contribute to the economical use of electrical power and to the miniaturization of the camera.

We claim:

1. A device for simultaneously and uniformly illuminating a plurality of dispaly elements in a camera comprising:
   an illuminating lamp, and
   a light transmitting diffusion plate means for diffusing light from said illuminating lamp and transmitting said diffused light with equal intensity to said plurality of display elements, said diffusion plate means including an opening for receiving and retaining said illuminating lamp, first and second diffusion reflection surfaces sloping downwardly from an apex at a predetermined slope, and a flat surface facing said plurality of display elements for transmitting diffused light from said first and second diffusion reflection surfaces to said plurality of display elements, said lamp retaining opening being positioned in line with said apex, said predetermined slope being selected so that light from said illuminating lamp is reflected with equal intensity from the interior faces of said first and second reflection surfaces.

2. The illuminating device of claim 1 wherein said first and second diffusion reflection surfaces are roughened surfaces which reflect light impinging their interior faces and transmit light impinging their exterior faces.

3. The illuminating device of claim 2 further including means for blocking the direct application of light from said illuminating lamp to said plurality of display elements.

4. The illuminating device of claim 3 wherein said display elements are liquid crystal display elements, which include a first liquid crystal display element for displaying shutter speed and a second liquid crystal display element for displaying aperture value.

5. The illuminating device of claim 4 further including a camera body, a viewfinder, and means for mounting said plurality of liquid crystal display elements and said light transmitting diffusion plate means with the retained illuminating lamp to said camera body.

6. The illuminating device of claim 5 further including light transmitting window means mounted to said camera body and positioned to direct received external light to the exterior faces of said first and second diffusion relfection surfaces.

7. The illuminating device of claim 6 wherein said means for mounting the display elements and diffusion plate includes a supporting plate positioned between the camera body and said viewfinder, said viewfinder inclusing optics for reflecting the data displayed by said plurality of display elements to an eyepiece of said viewfinder, whereby the displayed data can be viewed by a camera user.

* * * * *